(12) United States Patent
Lee et al.

(10) Patent No.: US 8,057,111 B2
(45) Date of Patent: Nov. 15, 2011

(54) LENS BARREL ASSEMBLY AND CAMERA INCLUDING THE SAME

(75) Inventors: Chang-bae Lee, Suwon-si (KR); Young-eun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/649,469

(22) Filed: Dec. 30, 2009

(65) Prior Publication Data

US 2010/0166402 A1    Jul. 1, 2010

(30) Foreign Application Priority Data

Dec. 31, 2008   (KR) .................. 10-2008-0138535

(51) Int. Cl.
*G03B 17/04*   (2006.01)
(52) U.S. Cl. ....................................... 396/348
(58) Field of Classification Search ........... 396/348–350
See application file for complete search history.

(56) References Cited

U.S. PATENT DOCUMENTS

| | | | | |
|---|---|---|---|---|
| 4,175,728 A | * | 11/1979 | Ferguson | 269/91 |
| 4,221,352 A | * | 9/1980 | Caveney | 248/74.3 |
| 4,440,374 A | * | 4/1984 | Achille | 248/544 |
| 4,951,083 A | * | 8/1990 | Okura et al. | 396/542 |
| 5,079,577 A | * | 1/1992 | Nomura | 396/72 |
| 5,371,569 A | * | 12/1994 | Tanaka | 396/542 |
| 5,515,135 A | * | 5/1996 | Katayama et al. | 396/85 |
| 5,826,126 A | * | 10/1998 | Nomura et al. | 396/542 |
| 6,493,511 B2 | * | 12/2002 | Sato | 396/72 |
| 2009/0040369 A1 | * | 2/2009 | Miyoshi | 348/374 |

* cited by examiner

*Primary Examiner* — Clayton E LaBalle
*Assistant Examiner* — Leon W Rhodes, Jr.
(74) *Attorney, Agent, or Firm* — Drinker Biddle & Reath LLP (57) ABSTRACT

A lens barrel assembly and a camera including the lens barrel assembly are provided. The lens barrel assembly includes a barrel case accommodating at least one optical lens, and a flexible printed circuit board (FPCB) configured to transmit signals between an area inside of the barrel case and an area outside of the barrel case. The barrel case comprises an outlet slit formed in the barrel case. The outlet slip being configured for extending the flexible printed circuit board to the area outside of the barrel case. Accordingly, the lens barrel assembly has an improved extension structure for extending the flexible printed circuit board which is configured to transmit signals between the inside and the outside of the lens barrel assembly.

18 Claims, 7 Drawing Sheets

FRONT ← → REAR

LENS BARREL ASSEMBLY AND CAMERA INCLUDING THE SAME

CROSS-REFERENCE TO RELATED PATENT APPLICATION

This application claims the benefit of Korean Patent Application No. 10-2008-0138535, filed on Dec. 31, 2008 in the Korean Intellectual Property Office, the entire contents of which is incorporated herein by reference.

BACKGROUND OF THE INVENTION

1. Field of the Invention

The present invention relates to a lens barrel assembly and a camera including the lens barrel assembly. More particularly, the present invention relates to a lens barrel assembly having an improved extension structure for extending a flexible printed circuit board (FPCB) configured to transmit signals between the inside and the outside of the lens barrel assembly, and a camera including the lens barrel assembly.

2. Description of the Related Art

Generally, a camera includes a lens barrel assembly and a camera body. The lens barrel assembly includes an optical lens installed in front of the camera body. The optical lens guides and forms an image of a subject. Also, a lens barrel including the optical lens is installed within in the lens barrel assembly. The lens barrel is driven along an optical axis so as to perform a zooming operation. The lens barrel receives a driving signal from the camera body via a flexible printed circuit board (FPCB).

The FPCB transmits signals between the inside and outside of the lens barrel assembly. In this case, physical interference may be caused during the zooming operation by extension portions that extend inside the lens barrel assembly. This physical interference can thus cause noise and a driving error of a lens barrel assembly. Due to the development of an optical image stabilizing (OIS) correction operation for correcting the adverse effects of a user's hand shaking while using the camera, the number of wires of the FPCB has increased, thereby increasing the width of the FPCB. Accordingly, adverse effects associated with the above-discussed noise and driving error of a lens barrel assembly FPCB have become more serious.

Generally, a separate fixing structure for fixing a FPCB to a lens barrel assembly is utilized. This arrangement, however, increases the number of components and associated manufacturing costs. In addition, the fixing structure installed in the lens barrel assembly may limit the extent to which a camera including the lens barrel assembly can be miniaturized.

SUMMARY OF THE INVENTION

The present invention provides a lens barrel assembly having an improved extension structure for extending a flexible printed circuit board (FPCB) configured to transmit signals between the inside and outside of the lens barrel assembly. The present invention also provides a camera including the lens barrel assembly.

According to an embodiment of the present invention, a lens barrel assembly is provided. The lens barrel assembly includes a barrel case accommodating at least one optical lens and a flexible printed circuit board (FPCB) configured to transmit signals between an area inside of the barrel case and an area outside of the barrel case. The barrel case may include an outlet slit formed in the barrel case. The outlet slit being configured for extending the flexible printed circuit board to the area outside of the barrel case.

The outlet slit may be formed along a circumferential direction of the barrel case.

The barrel case may further include an assembly slit formed in the barrel case, the assembly slit being connected to the outlet slit.

The assembly slit may be opened towards a front or rear portion of the barrel case, and the assembly slit may be connected to the outlet slit.

The lens barrel assembly may further include a lens assembly installed and configured so as to move in front and rear directions. The at least one optical lens may be installed within the lens assembly.

An end of the flexible printed circuit board may be connected to the lens assembly, and another end of the flexible printed circuit board may extend to the area outside of the barrel case.

A portion of the flexible printed circuit board accommodated in the lens barrel assembly may have a length that is sufficient to correspond to the movement of the lens assembly in the front and rear directions. For example, the flexible printed circuit board may have a length sufficient to extend around from the outlet slit in the front and rear directions and extending towards the lens assembly.

The outlet slit may be formed away from the front and rear of the barrel case.

For example, the barrel case may include a guide barrel disposed at an outermost portion of the lens barrel assembly, and the outlet slit may be formed in the guide barrel.

An edge of the barrel case defining the outlet slit may be a rounded curved surface.

The lens barrel assembly may further include a separation blocking stumbling projection formed at an end of the outlet slit.

According to another embodiment of the present invention, a camera is provided that includes a camera body and a lens assembly including an optical lens installed in the lens assembly. The lens assembly is configured to move in front and rear directions. Also included is a flexible printed circuit board configured to transmit signals between the lens assembly and the camera body and a barrel case including an inner space that accommodates the lens assembly and an outlet slit for extending the flexible printed circuit board to a position outside of the barrel case.

The outlet slit may be formed along a circumferential direction of the barrel case.

The barrel case may include an assembly slit formed in the barrel case. The assembly slit being connected to the outlet slit.

The assembly slit may be opened towards a front or rear portion of the barrel case. Also, the assembly slit may be connected to the outlet slit.

The outlet slit may be formed away from the front and rear of the barrel case.

For example, the barrel case may include a guide barrel disposed at an outermost portion of the lens barrel assembly, and the outlet slit may be formed in the guide barrel.

An edge of the barrel case defining the outlet slit may be a rounded curved surface.

The camera may further include a separation blocking stumbling projection formed at an end of the outlet slit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
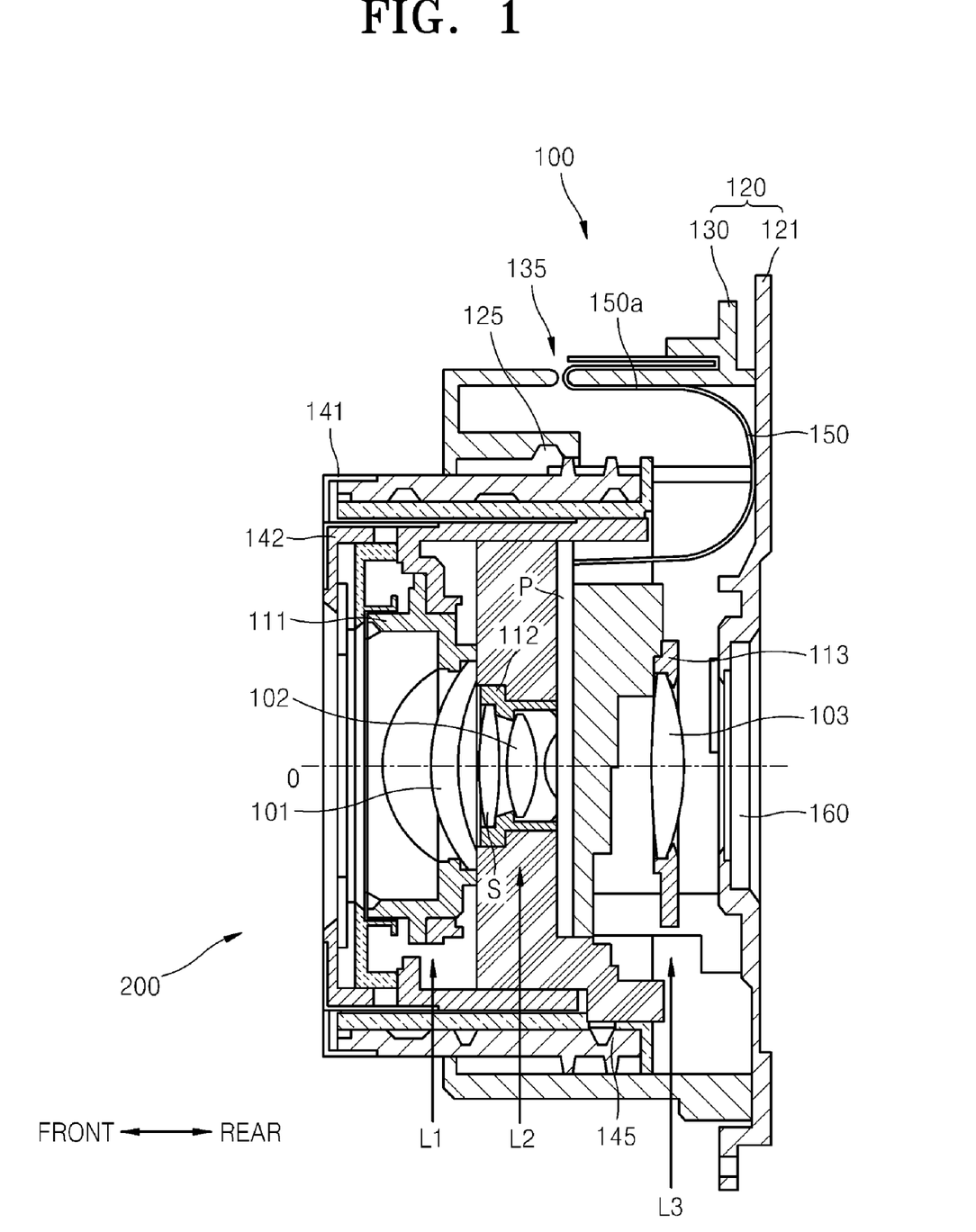
FIGS. 1 through 3 are vertical cross-sectional views of examples of a lens barrel assembly in various states, according to an embodiment of the present invention.
Figure 2:
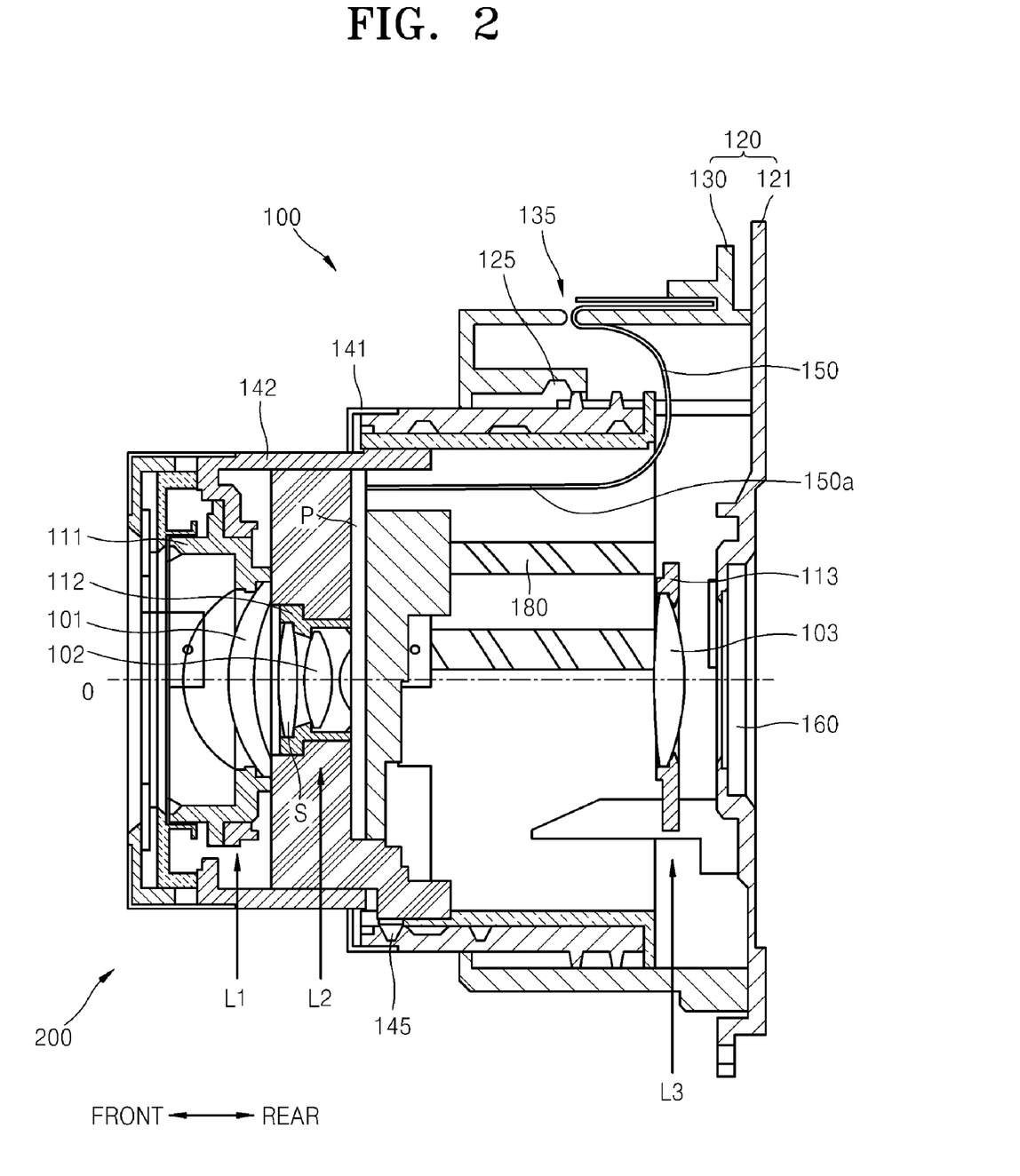
Figure 3:
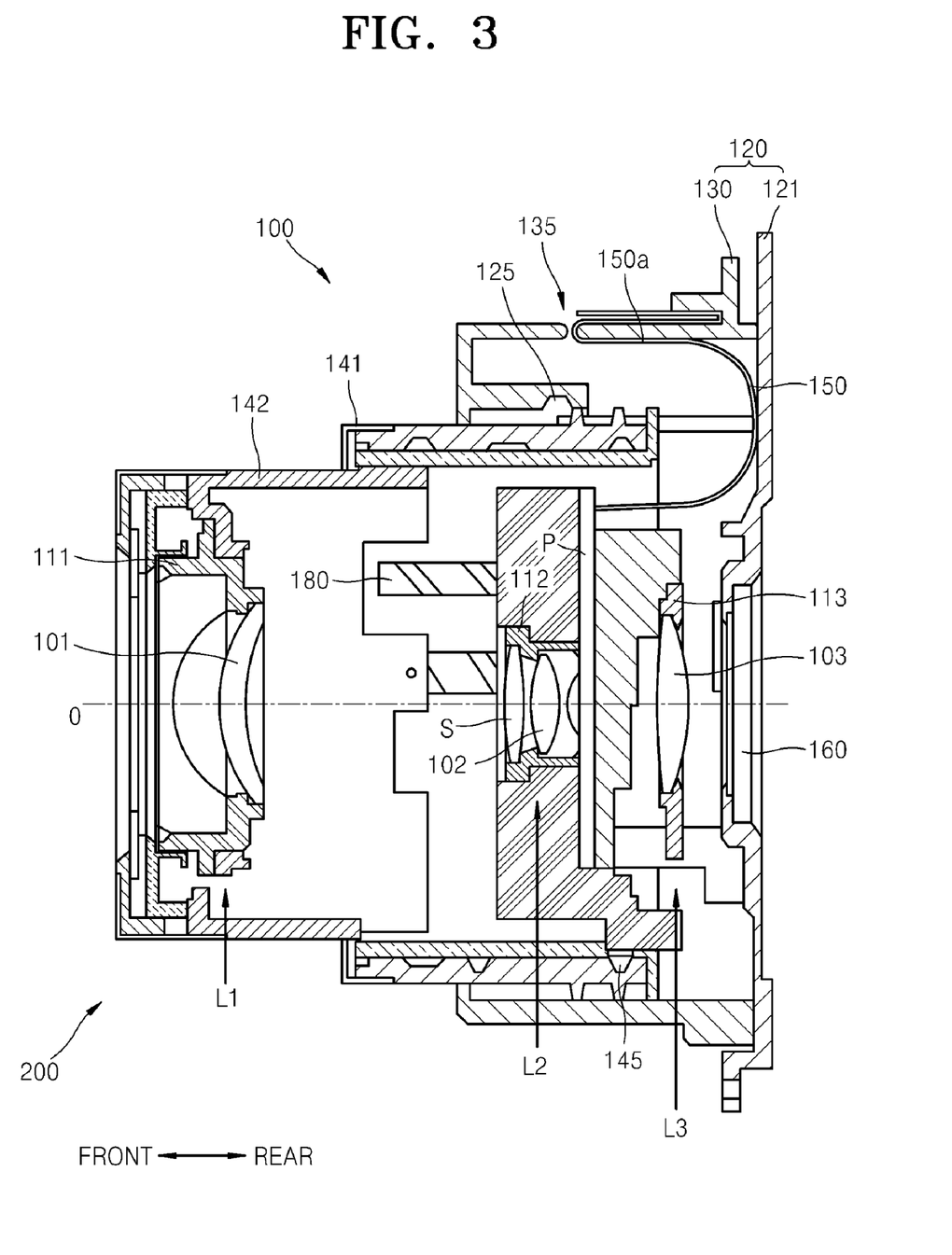

Hereinafter, a lens barrel assembly and a camera including the lens barrel assembly will be described with regard to exemplary embodiments of the present invention with reference to the attached drawings. FIGS. 1 through 3 are vertical cross-sectional views of examples of a lens barrel assembly 200 in various states, according to an embodiment of the present invention. That is, FIG. 1 is a cross-sectional view of an example of the lens barrel assembly 200 in a state in which the lens barrel assembly 200 is retracted backward when a photographing operation is not being performed. FIGS. 2 and 3 are cross-sectional views of examples of the lens barrel assembly 200 in states in which the lens barrel assembly 200 is controlled to be in a telephoto state and a wide-angle state, respectively, when the lens barrel assembly 200 is protruded forward. The lens barrel assembly 200 includes first through third lens assemblies L1, L2 and L3, and a photoelectric transformer 160, which are accommodated in the barrel case 100.

The barrel case 100 includes a fixed barrel 120 that is fixed to a camera body. The barrel case also includes first and second movable barrels 141 and 142 that extend out of the fixed barrel 120 when a photographing operation is being performed. The fixed barrel 120 may include, for example, a lens base 121 and a guide barrel 130 having a cylindrical shape and disposed at an outermost portion of the lens barrel assembly 200. The outermost portion is viewed, for example, in a radial direction of the lens barrel assembly 200.

The first movable barrel 141 is accommodated in the fixed barrel 120 and is movable in front and rear directions with respect to the fixed barrel 120. The second movable barrel 142 is accommodated in the first movable barrel 141 and is movable in the front and rear directions with respect to the first movable barrel 141. The first and second movable barrels 141 and 142 move in the front direction so as to extend out of the fixed barrel 120 when a photographing operation is being performed. Also, the first and second movable barrels 141 and 142 move in the rear direction so as to be accommodated in the fixed barrel 120 when a photographing operation is not performed. The movement of the first and second movable barrels 141 and 142 is guided by cam-followers 125 and 145. The cam-followers 125 and 145 are provided on a cylindrical surface of the fixed barrel 120 and the first movable barrel 141. Also, the cam-followers 125 and 145 are provided on a cylindrical surface of the first movable barrel 141 and the second movable barrel 142.

The first through third lens assemblies L1, L2 and L3 may respectively include first through third optical lenses 101, 102 and 103, and first through third fixers 111, 112 and 113 for respectively installing the first through third optical lenses 101, 102 and 103. At least one of the first through third lens assemblies L1, L2 and L3 may perform, for example, zoom-in and zoom-out operations while moving in the front and rear directions along an optical axis 'O' so as to perform a transforming operation between the telephoto state and the wide-angle state.

For example, the second lens assembly L2 may be connected to a driving motor (not shown) so as to move in the front and rear directions. That is, the second lens assembly L2 is inserted into a lead screw of a driving shaft 180 extending across an internal space of the lens barrel assembly 200. When an operational signal is applied to the driving motor (not shown), the driving shaft 180 connected to the same axle of the driving motor rotates, and the second lens assembly L2 moves in the front and rear directions along the lead screw having a spiral shape and formed on the driving shaft 180. As illustrated in the example of FIG. 2, in the telephoto state, the second lens assembly L2 moves in the front direction so as to be close to the first lens assembly L1. In the wide-angle state, the second lens assembly L2 moves in the rear direction so as to be close to the third lens assembly L3.

The second lens assembly L2 may perform, for example, a shake correction operation (that is, an optical image stabilizing (OIS) operation) for correcting a unwanted effects caused by a user's shaking of a camera by controlling a location of the second optical lens 102. For example, the second lens assembly L2 may fix a focal point location of a subject, which is focused on the photoelectric transformer 160, by moving the second optical lens 102 in a direction perpendicular to the optical axis 'O' in proportion to the detected shake of the camera. To achieve this, an actuator (not shown) for moving the second optical lens 102 to a target location may be installed close to the second optical lens 102. The actuator may include, for example, a voice coil motor (VCM). The shake correction operation may be controlled by an OIS control signal received from the camera body. A shutter S for controlling the amount of light exposed to the photoelectric transformer 160 may be installed in the second lens assembly L2. An open/close operation of the shutter S may be performed according to a shutter control signal received from the camera body. A circuit board P for converting the OIS control signal and shutter control signal received from the camera body into appropriate driving signals may be installed in the second lens assembly L2.

A flexible printed circuit board (FPCB) 150 for transmitting signals between the second lens assembly L2 and the camera body may be connected to the second lens assembly L2, for example, to the circuit board P of the second lens assembly L2. The flexible printed circuit board 150 may transmit, for example, the OIS control signal and the shutter control signal, which control the shake correction operation, between the camera body and the second lens assembly L2.

As illustrated in the examples of FIGS. 1 through 3, the flexible printed circuit board 150 may be flexibly deformed according to the movement of the second lens assembly L2 connected to an end of the flexible printed circuit board 150 or a protruding/retracting operation of the lens barrel assembly 200, and it maintains a stable connection to the second lens assembly L2. In addition, the flexible printed circuit board 150 may have a length sufficient to correspond to a variable location of the second lens assembly L2.

As illustrated in the example of FIG. 1, the flexible printed circuit board 150 extends out of the barrel case 100 from the second lens assembly L2 through an outlet slit 135 that is formed in the guide barrel 130. One end of the flexible printed circuit board 150 is connected to a main circuit board (not shown) installed within the camera body. The outlet slit 135 may be formed away from the rear of the barrel case 100. For example, the outlet slit 135 may be formed away from the lens base 121 covering the rear of the barrel case 100 in the front direction. The flexible printed circuit board 150 connected to the second lens assembly L2 extends towards the guide barrel 130 via the rear of the barrel case 100 and along an inner surface of the lens base 121. The flexible printed circuit board 150 extending in the front direction along an inner surface of the guide barrel 130 extends out of the barrel case 100, and is then folded around the outlet slit 135 so as to surround the guide barrel 130 and extend in the rear direction.

As described above, the length of the flexible printed circuit board 150 may be sufficient to correspond to the variable location of the second lens assembly L2. As a result, the flexible printed circuit board 150 may correspond to a variable location of the second lens assembly L2 by folding or unfolding a portion 150a extending along the inner surface of the guide barrel 130 according to the variable location of the second lens assembly L2 while the flexible printed circuit board 150 is nearly pivoted in the outlet slit 135.

Referring to the example of FIG. 2, when the second lens assembly L2 moves in the front direction, the portion 150a of the flexible printed circuit board 150 extending along the inner surface of the guide barrel 130 is unfolded as the flexible printed circuit board 150 is drawn by the second lens assembly L2. Then, referring to the example of FIG. 3, when the second lens assembly L2 moves in the rear direction, the portion 150a of the flexible printed circuit board 150 is closely adhered to the inner surface of the guide barrel 130 by a self-elastic force of the flexible printed circuit board 150 while the flexible printed circuit board 150 that is previously unfolded is folded in a 'U' shape.

The lens barrel assembly 200 illustrated in the examples of FIGS. 1 through 3 may be assembled with the camera body (not shown) so as to constitute the camera. As illustrated in the examples of FIGS. 1 through 3, the lens barrel assembly 200 includes the photoelectric transformer 160 converting an image of a subject into an electric image signal, and the first through third lens assemblies L1, L2 and L3 for forming an image of the subject on the photoelectric transformer 160. The camera body may include circuit structures for processing the electrical image signal transmitted from the lens barrel assembly 200, that is, from the photoelectric transformer 160 and storing the electrical image signal in an appropriate file format.

Figure 4:
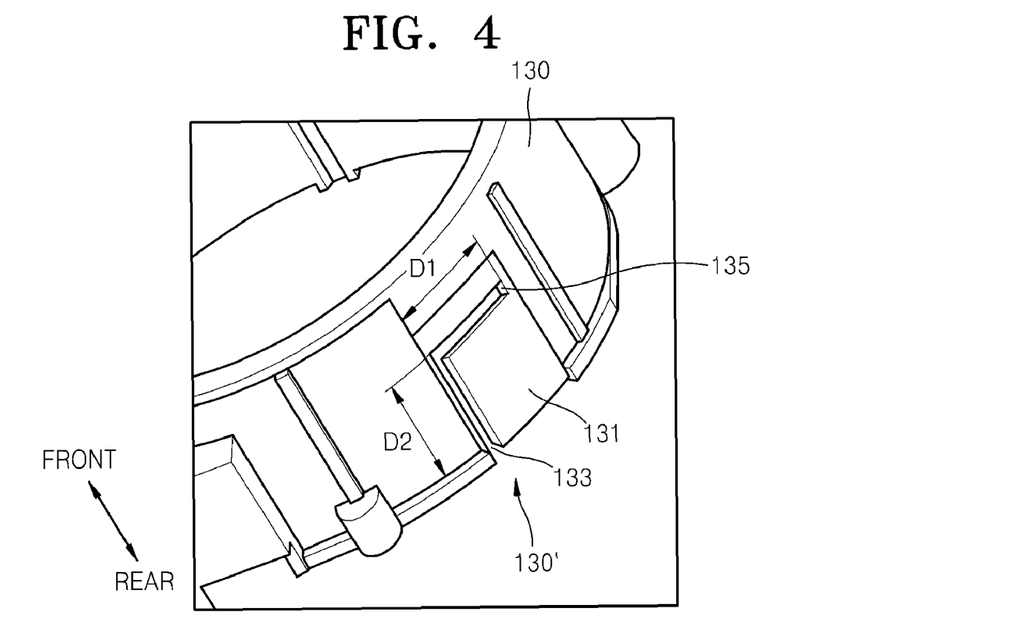
FIG. 4 is a perspective view of an example of a guide barrel in which an outlet slit is formed, according to an embodiment of the present invention.
Figure 5:
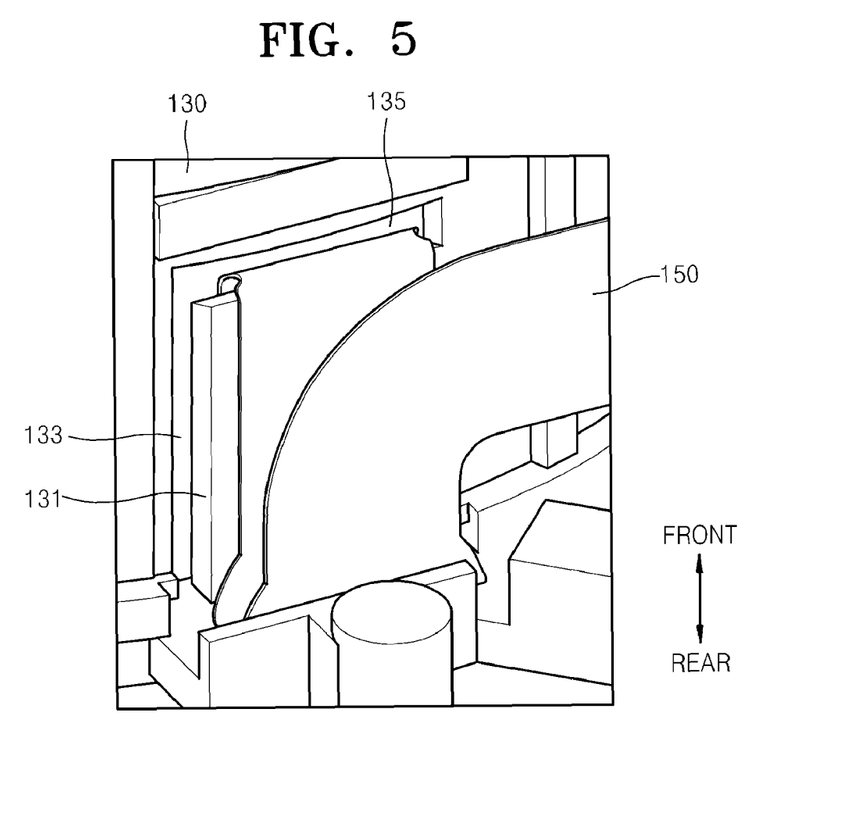
FIG. 5 is a perspective view illustrating an example of a state in which a flexible printed circuit board (FPCB) is installed using an outlet slit, according to an embodiment of the present invention.

FIG. 4 is a perspective view of an example of a guide barrel 130 in which the outlet slit 135 is formed, according to an embodiment of the present invention. FIG. 5 is a perspective view illustrating an example of a state in which the flexible printed circuit board 150 is installed using the outlet slit 135, according to an embodiment of the present invention. The outlet slit 135 may be formed in the guide barrel 130 along a circumferential direction thereof so as to have a first length D1. The first length D1 of the outlet slit 135 may correspond to the width of the flexible printed circuit board 150, and may be sufficiently large to prevent physical interference between the flexible printed circuit board 150 and edges of the outlet slit 135, for example. However, the outlet slit 135 is designed to have a size, that is, the first length D1, just slightly greater than the width of the flexible printed circuit board 150, for example, thereby preventing an exposure of external light to the inside of the guide barrel 130, that is, the inside of the lens barrel assembly 200. This also prevents the penetration of external foreign substances from moving inside of the lens barrel assembly 200.

An assembly slit 133 together with the outlet slit 135 may be formed, for example, in the guide barrel 130. The assembly slit 133 may be formed in the front and rear direction of the guide barrel 130 so as to have a second length D2. Also, the assembly slit 133 may extend from the rear of the guide barrel 130 to the outlet slit 135 towards the front of the guide barrel 130. Referring to the example of FIG. 4, the assembly slit 133 may be opened towards the rear of the guide barrel 130. Alternatively, the assembly slit may be opened towards the front of the guide barrel 130, and may be formed in the guide barrel 130 in the front and rear directions from an opening 130' to the outlet slit 135.

When both ends of the flexible printed circuit board 150 are respectively connected to the second lens assembly L2 and the main circuit board (not shown), an intermediate portion of the flexible printed circuit board 150 may be fixed to the guide barrel 130 via the opening 130' of the assembly slit 133. The portion of the flexible printed circuit board 150 fixed to the guide barrel 130 may be guided along the assembly slit 133 so as to be accommodated in the outlet slit 135.

For example, the assembly slit 133 and the outlet slit 135 may be vertically bent as a whole, wherein ends of the assembly slit 133 and the outlet slit 135 are connected to each other. A cutting portion 131 that is surrounded by the assembly and outlet slits 133 and 135 so as to be cut from the guide barrel 130 may support the portion of the flexible printed circuit board 150 that extends out of the barrel case 100 through the outlet slit 135, for example.

Referring to the example of FIG. 5, the flexible printed circuit board 150 extending out of the barrel case 100 through the outlet slit 135 is supported by the cutting portion 131, extending in the rear direction, is folded around the rear of the barrel case 100, and then extends in the front direction, so as to have a 'U' shape, for example.

In the examples of FIGS. 4 and 5, the outlet slit 135 and the assembly slit 133 are formed in the guide barrel 130, but are not limited to such an arrangement. For example, the outlet slit 135 and the assembly slit 133 may be formed in any portion of the barrel case 100 as long as the flexible printed circuit board 150 extends out of the barrel case 100, for example.

Figure 6:
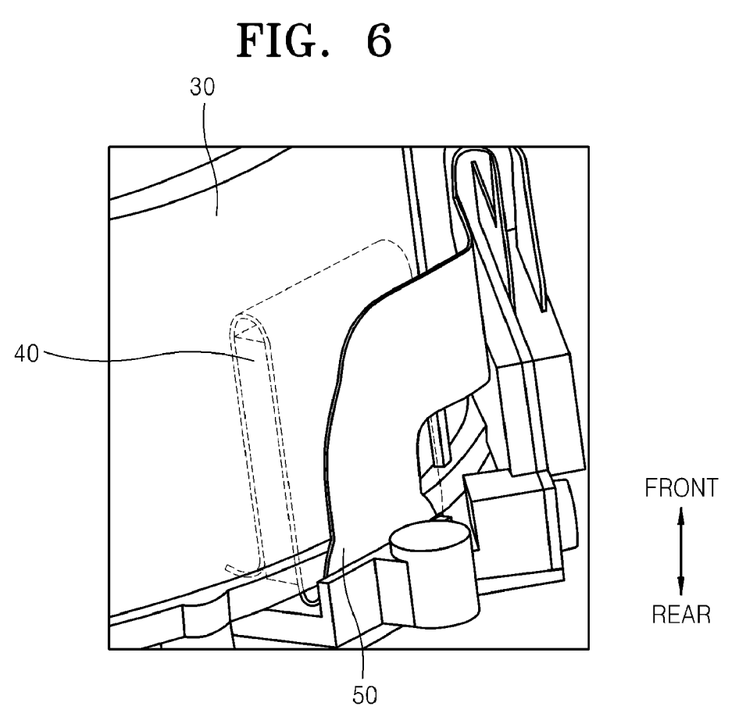
FIGS. 6 and 7 are perspective views illustrating examples of states in which a flexible printed circuit board is installed, according to Comparative Examples 1 and 2.
Figure 7:
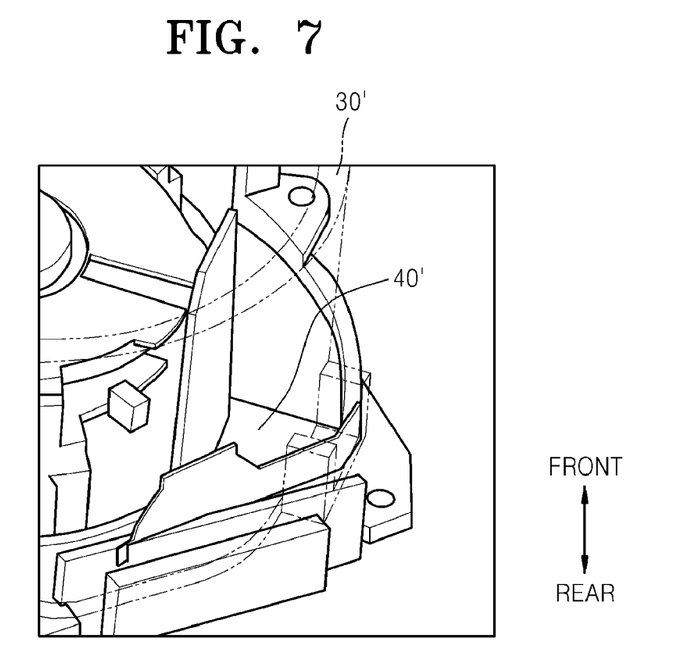

FIGS. 6 and 7 are perspective views illustrating examples of states in which a flexible printed circuit board 50 is installed, according to Comparative Examples 1 and 2, respectively. Referring to the examples of FIGS. 6 and 7, press forming materials 40 and 40' for supporting the flexible printed circuit board 50 are disposed in lens barrel assemblies 30 and 30', respectively. As illustrated in the example of FIG. 6, the flexible printed circuit board 50 is folded along the press forming material 40 in a '∩' shape, and extends out of the lens barrel assembly 30 via the rear of the lens barrel assembly 30. The flexible printed circuit board 50 is folded along the press forming material 40 so as to correspond to a variable location of a lens assembly. In Comparative Examples 1 and 2, it is necessary to manufacture and assemble the press forming materials 40 and 40' for supporting the flexible printed circuit board 50, and the press forming materials 40 and 40' are installed in the lens barrel assemblies 30 and 30', thereby causing physical interference between the press forming materials 40 and 40' and movable members such as a lens assembly, and also causing noise due to the physical interference. In addition, when a moving axis is distorted, or an error arises in terms of locations of the press forming materials 40 and 40', both the resulting physical interference and the resulting noise may become more serious. In particular, along with the user's requirements for small-sized barrels, interference due to the press forming materials 40 and 40' may also become more serious.

The flexible printed circuit board 150 is supported by forming the outlet slit 135 in the lens barrel assembly 200, in other words, in the guide barrel 130 of the lens barrel assembly 200, as illustrated in the example of FIG. 4. Accordingly, manufacturing costs may be reduced by as much as those required to manufacture the press forming materials 40 and 40'. An assembly process for the press forming materials 40 and 40' may be omitted. As a result, the associated assembly costs may decrease. In addition, in the example of FIG. 4, there is no noise and physical interference between the press forming materials 40 and 40' and surrounding members.

Figure 8:
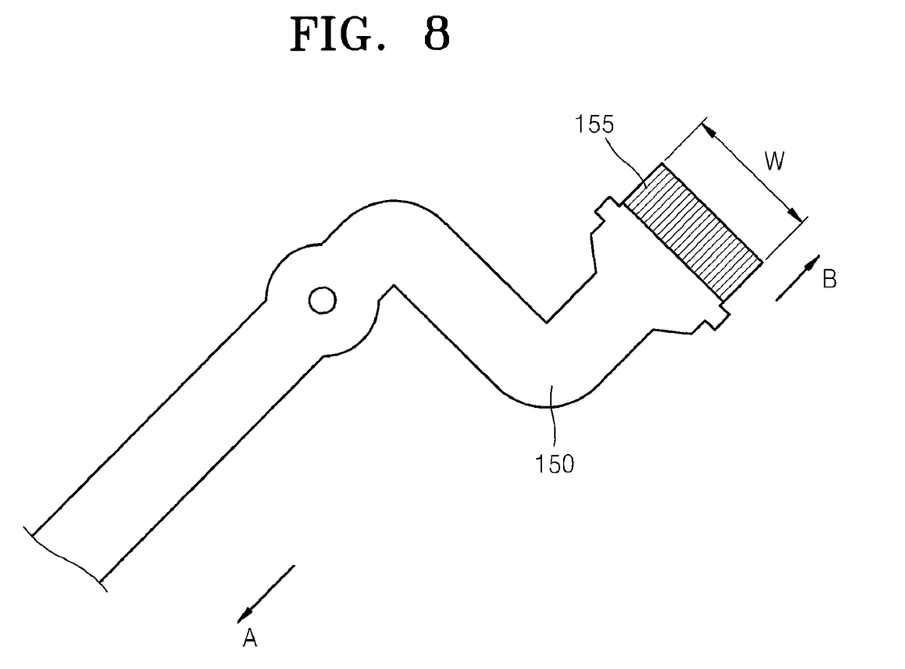
FIG. 8 is a schematic perspective view of an example of a flexible printed circuit board configured to transmit signals between a lens assembly and camera body, according to an embodiment of the present invention.

FIG. 8 is a schematic perspective view of an example of the flexible printed circuit board 150 of FIGS. 1 through 3, according to an embodiment. The flexible printed circuit board 150 extends in an 'A' direction towards the second lens assembly L2, and it extends in a 'B' direction towards the main circuit board of the camera body. The flexible printed circuit board 150 may thus transmit the OIS control signal for controlling the shake correction operation and the shutter control signal for controlling the open/close operation of the shutter S between the camera body and the second lens assembly L2, for example. The flexible printed circuit board 150 includes a plurality of signal patterns (not shown) for transmitting the respective different control signals. A contact portion 155 of the flexible printed circuit board 150 having an electrical contact point with respect to the main circuit board is formed so as to have a wide width W so that the signal patterns have a sufficient pitch.

If the size, that is, the first length D1, of the outlet slit 135 is increased in order to correspond to the width W of the contact portion 155, light leakage and penetration of external foreign substances may occur. As illustrated in the example of FIG. 4, by forming the assembly slit 133 in the lens barrel assembly 200, that is, in the guide barrel 130 of the lens barrel assembly 200, the intermediate portion of the flexible printed circuit board 150 may be fixed to the lens barrel assembly 200, that is, to the guide barrel 130 of the lens barrel assembly 200 without regard to the width W of the contact portion 155. The assembly slit 133 may facilitate assembly of the flexible printed circuit board 150 including the contact portion 155 having the width W.

Figure 9:
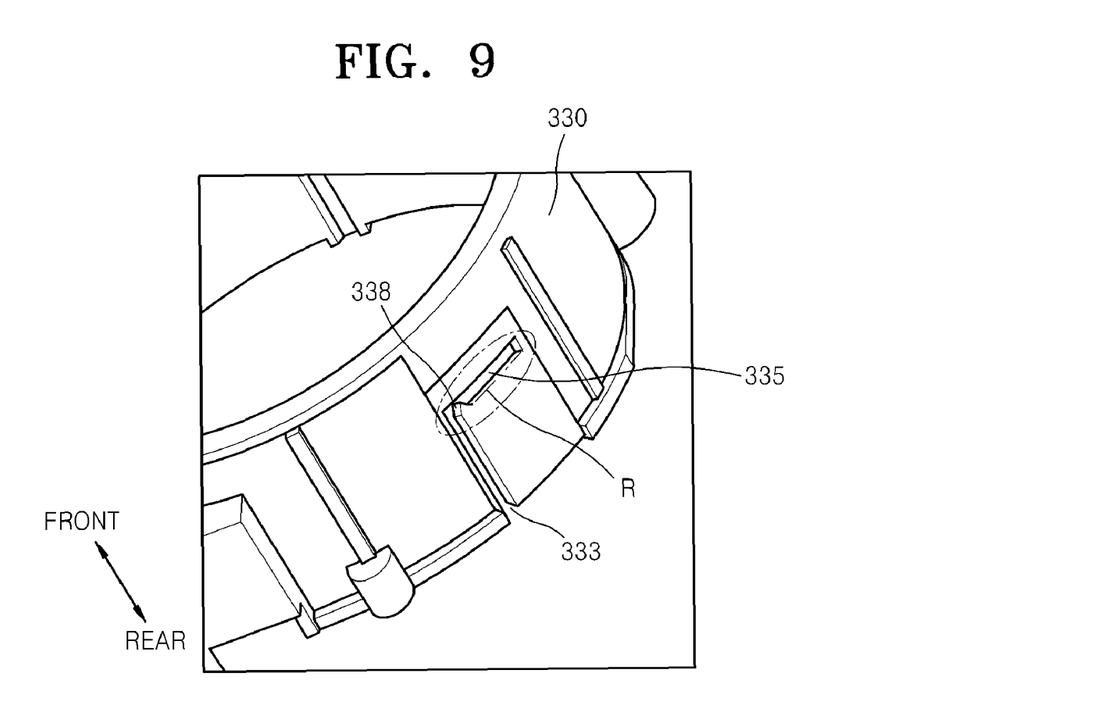
FIG. 9 is a perspective view of an example of a guide barrel in which an outlet slit is formed, according to another embodiment of the present invention.

FIG. 9 is a perspective view of a guide barrel 330 in which an outlet slit 335 is formed, according to another embodiment of the present invention. Referring to the example of FIG. 9, the outlet slit 335 for extending the flexible printed circuit board 150 out of a barrel case is formed in the guide barrel 330 along a circumferential direction thereof. An assembly slit 333 is formed in the guide barrel 330 in the front and rear directions and extends towards the outlet slit 335.

Figure 10:
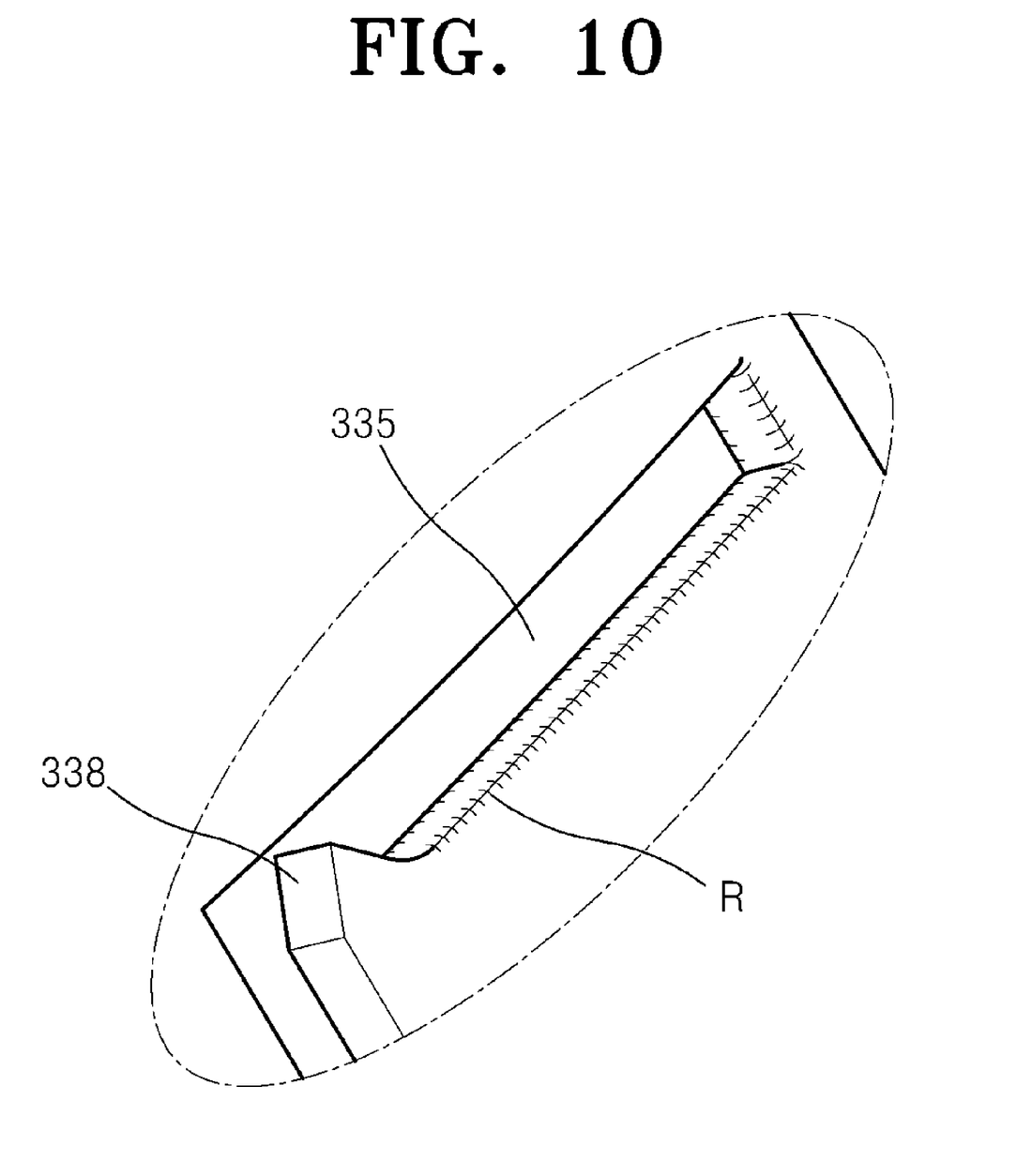
FIG. 10 is an enlarged perspective view of an example of a main portion of the example of FIG. 9, according to an embodiment of the present invention.

FIG. 10 is an enlarged perspective view of an example of a main portion of the example of FIG. 9, according to an embodiment of the present invention. Referring to the example of FIG. 10, a separation blocking stumbling projection 338 for blocking separation of the flexible printed circuit board 150 is formed at an open end of the outlet slit 335. The separation blocking stumbling projection 338 may protrude from an inner surface of the outlet slit 335 to the inside of the outlet slit 335. The separation blocking stumbling projection 338 may fix an assembly location of the flexible printed circuit board 150 supported by the outlet slit 335, for example.

When the flexible printed circuit board 150 supported by the outlet slit 335 comes into contact with the inner surface of the outlet slit 335, physical interference such as friction may occur due to a contact portion between the flexible printed circuit board 150 and the inner surface of the outlet slit 335, for example. By forming a rounded curved surface R at an edge of the inner surface of the outlet slit 335, damage to the flexible printed circuit board 150 due to the friction may be minimized.

According to the present invention, noise and driving error of a lens barrel assembly may be minimized by improving an extension structure for extending a flexible printed circuit board configured to transmit signals between the inside and outside of a lens barrel assembly.

In addition, because a separate assembly structure for fixing the flexible printed circuit board to the lens barrel assembly is not required, the overall number of components and associated manufacturing costs may be reduced. In addition, a lens barrel assembly that is appropriate for a small-sized camera may be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens barrel assembly comprising:
a barrel case accommodating at least one optical lens; and
a flexible printed circuit board (FPCB) configured to transmit signals between an area inside of the barrel case and an area outside of the barrel case,
wherein the barrel case comprises an outlet slit formed along a first direction in the barrel case, the outlet slit being configured for extending the flexible printed circuit board to the area outside of the barrel case, and
wherein the barrel case further comprises an assembly slit formed along a second direction in the barrel case, the first and second directions being configured with respect to each other so that the combined outlet slit and the assembly slit is bent as a whole, the assembly slit being connected to the outlet slit.

2. The lens barrel assembly of claim 1, wherein the outlet slit is formed along a circumferential direction of the barrel case.

3. The lens barrel assembly of claim 1, wherein the assembly slit is opened towards a front or a rear portion of the barrel case, and the assembly slit is connected to the outlet slit.

4. The lens barrel assembly of claim 1, further comprising a lens assembly installed and configured so as to move in front and rear directions, wherein the at least one optical lens is installed within the lens assembly.

5. The lens barrel assembly of claim 4, wherein an end of the flexible printed circuit board is connected to the lens assembly, and another end of the flexible printed circuit board extends to the area outside of the barrel case.

6. The lens barrel assembly of claim 4, wherein a portion of the flexible printed circuit board accommodated in the lens barrel assembly has a length that is sufficient to correspond to the movement of the lens assembly in the front and rear directions.

7. The lens barrel assembly of claim 6, wherein the flexible printed circuit board has a length sufficient to extend around from the outlet slit in the front and rear directions and extending towards the lens assembly.

8. The lens barrel assembly of claim 1, wherein the outlet slit is formed away from the front and rear of the barrel case.

9. The lens barrel assembly of claim 1, wherein the barrel case comprises a guide barrel disposed at an outermost portion of the lens barrel assembly, and wherein the outlet slit is formed in the guide barrel.

10. The lens barrel assembly of claim 1, wherein an edge of the barrel case defining the outlet slit is a rounded curved surface.

11. The lens barrel assembly of claim 1, further comprising a separation blocking stumbling projection formed at an end of the outlet slit.

12. A camera comprising:
a camera body;
a lens assembly comprising an optical lens installed in the lens assembly and configured to move in front and rear directions;
a flexible printed circuit board configured to transmit signals between the lens assembly and the camera body; and
a barrel case comprising an inner space that accommodates the lens assembly and an outlet slit formed along a first direction in the barrel case for extending the flexible printed circuit board to a position outside of the barrel case,
wherein the barrel case further comprises an assembly slit formed along a second direction in the barrel case, the first and second directions being configured with respect to each other so that the combined outlet slit and the assembly slit is bent as a whole, the assembly slit being connected to the outlet slit.

13. The camera of claim 12, wherein the outlet slit is formed along a circumferential direction of the barrel case.

14. The camera of claim 12, wherein the assembly slit is opened towards a front or rear portion of the barrel case, and the assembly slit is connected to the outlet slit.

15. The camera of claim 12, wherein the outlet slit is formed away from the front and rear of the barrel case.

16. The camera of claim 12, wherein the barrel case comprises a guide barrel disposed at an outermost portion of the lens barrel assembly, and wherein the outlet slit is formed in the guide barrel.

17. The camera of claim 12, wherein an edge of the barrel case defining the outlet slit is a rounded curved surface.

18. The camera of claim 12, further comprising a separation blocking stumbling projection formed at an end of the outlet slit.

* * * * *

UNITED STATES PATENT AND TRADEMARK OFFICE
CERTIFICATE OF CORRECTION

PATENT NO. : 8,057,111 B2
APPLICATION NO. : 12/649469
DATED : November 15, 2011
INVENTOR(S) : Chang-bae Lee et al.

It is certified that error appears in the above-identified patent and that said Letters Patent is hereby corrected as shown below:

IN THE CLAIMS:

In Claim 1, Column 8, lines 44-45, replace "the combined outlet slit and the assembly slit" with -- a combination of said outlet slit and said assembly slit --

In Claim 12, Column 10, lines 4-5, replace "the combined outlet slit and the assembly slit" with -- a combination of said outlet slit and said assembly slit --

Signed and Sealed this
Twelfth Day of March, 2013

Teresa Stanek Rea
*Acting Director of the United States Patent and Trademark Office*